United States Patent [19]

O'Callaghan et al.

[11] 3,828,168

[45] Aug. 6, 1974

[54] CONTROLLED VELOCITY DRIVE

[75] Inventors: Gerald F. O'Callaghan, Kenosha; Donald D. Woelz, Milwaukee, both of Wis.

[73] Assignee: Eaton Corporation, Cleveland, Ohio

[22] Filed: Mar. 31, 1972

[21] Appl. No.: 240,221

[52] U.S. Cl................ 235/150.1, 310/94, 318/603, 318/615
[51] Int. Cl. ............................................ H02p 5/00
[58] Field of Search....... 235/150.1, 92 MP; 310/94; 318/603

[56] References Cited
UNITED STATES PATENTS

| | | | |
|---|---|---|---|
| 3,110,853 | 11/1963 | Jones................................. | 318/312 |
| 3,206,665 | 9/1965 | Burlingham........................ | 318/312 |
| 3,331,006 | 7/1967 | Strand et al. ...................... | 318/314 |
| 3,483,362 | 12/1969 | Feldmann et al................ | 235/150.5 |

*Primary Examiner*—Eugene G. Botz
*Attorney, Agent, or Firm*—Teagno & Toddy

[57] ABSTRACT

A control for a controlled velocity drive having a driven load includes a generator for generating a reference pulse train wherein each pulse is indicative of a desired incremental position of the load and the frequency of the pulses is indicative of a desired velocity of the load, first sensing means for sensing the actual position and velocity of the load and generating a second pulse train wherein each pulse is indicative of an actual incremental position of the load and the frequency of the pulses is indicative of the actual velocity of the load, and an up-down counter for digitally summing the pulses of the reference pulse train and the pulses of the second pulse train and generating a position error signal. The control system further includes means for converting the reference pulse train to an analog base velocity signal which has a magnitude indicative of the desired velocity of the load and second sensing means for sensing the actual velocity of the load and generating an analog velocity signal indicative thereof. A compensation circuit is provided responsive to the analog velocity signal and the analog base velocity signal to provide a compensation signal which is summed with the base velocity signal and the position error signal to provide an analog control signal. The control signal is directed to and cooperates with an analog velocity control for controlling the velocity of the load so the actual velocity of the load precisely follows the desired velocity and a zero average error in velocity results.

56 Claims, 7 Drawing Figures

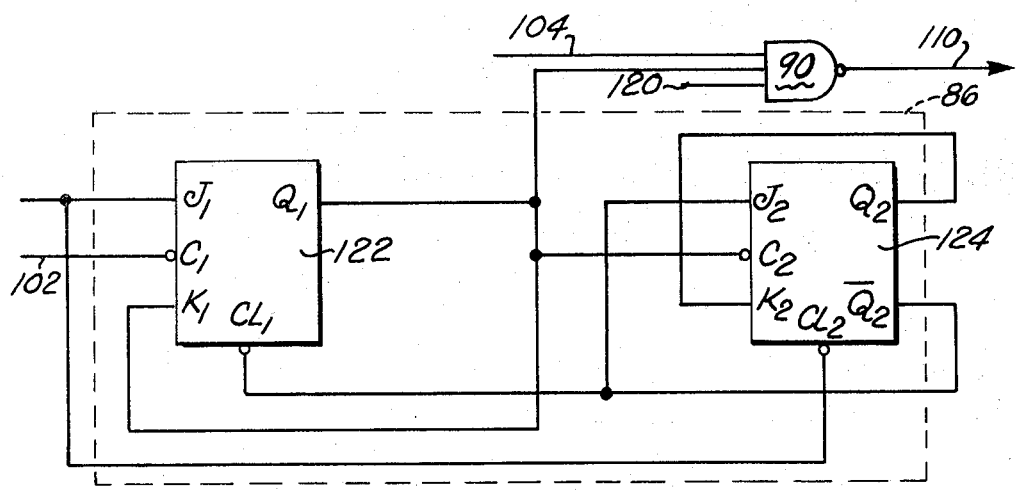
FIG. 3
| J | K | $Q_{N+1}$ |
|---|---|---|
| 0 | 0 | Q |
| 0 | 1 | 0 |
| 1 | 1 | $\bar{Q}_{N+1}$ |
| 1 | 0 | 1 |
| CL GROUND | 1 OR 0 | 1 OR 0 | 0 |
FIG. 4
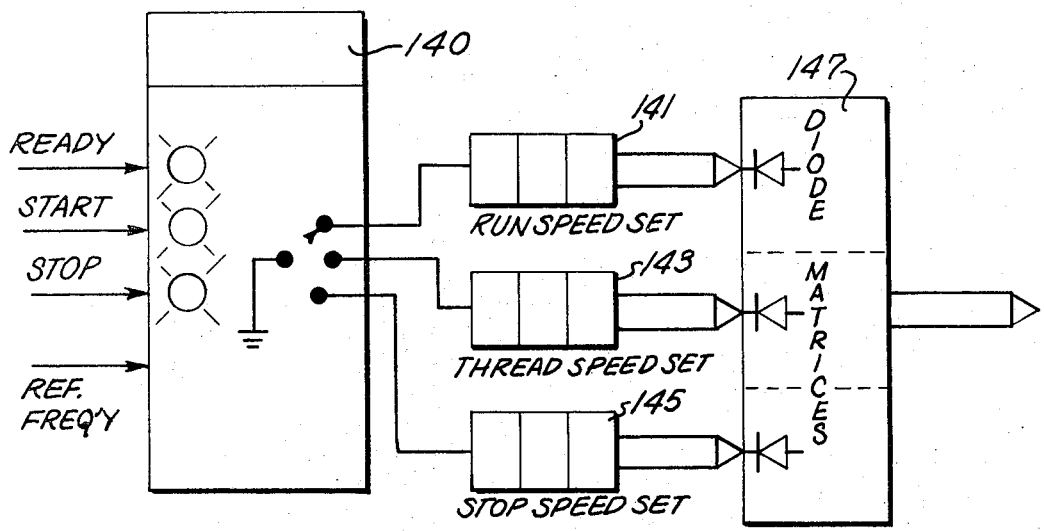
FIG. 5

CONTROLLED VELOCITY DRIVE

BACKGROUND OF THE INVENTION

The present invention relates to a control system for a controlled velocity drive having a driven load or a plurality of driven loads and more particularly to a control system wherein a reference pulse train is generated to set the velocity of the load and the average error in velocity of the load, which is the difference between the desired velocity, and the actual velocity for a given time period, is zero. Control systems for controlling the speed of a driven load are known in the art. One such system is disclosed in the O'Callaghan U.S. Pat. NO. 3,629,633 issued Dec. 21, 1971 and assigned to the assignee of the present invention. The known control systems, such as disclosed in U.S. Pat. No. 3,629,633, generally include means for establishing a reference analog voltage which is fed to the system and which acts to set the desired velocity of the load. The setting of a velocity control system by an analog voltage reference signal has the disadvantage associated therewith that analog voltages are not extremely stable. Hence, if the reference analog voltage varies, even slightly, a variance in the output velocity of the controlled drive will occur. Moreover, the known control systems utilize analog feedback signals which also tend to fluctuate and create instability in the control. Thus, these known systems tend to be less than perfectly stable due to fluctuations in the reference signal and the feedback signals.

A control system for a controlled velocity drive having a driven load or a plurality of driven loads which controls the velocity of the load so that the average velocity error is zero may be utilized in a number of different applications. For example, the present controlled velocity drive may be utilized to control the drive in a paper mill where the velocity of a web of paper as it travels through the mill is critical in that a change in the velocity of a portion of the web relative to another portion of the web may cause the paper to tear. The utilization of the present invention will enable precise control of the velocity of the web so that tearing of the paper will not occur.

SUMMARY OF THE PRESENT INVENTION

In accordance with the present invention, a controlled velocity drive is provided for maintaining a zero error in average velocity between the desired and actual velocity of a driven load. The present velocity control system utilizes a constant frequency generator for setting the desired velocity of a driven load. The constant frequency generator produces a constant frequency reference pulse train wherein each incremental pulse is indicative of a desired position of the load and the frequency of the reference pulses is indicative of a desired velocity of the load. The utilization of a frequency generator rather than an analog voltage reference generator for setting the velocity of the load substantially increases the stability of the reference signal so that a zero average velocity error results. Moreover, the present invention also provides both analog and digital feedback signals with the digital signals increasing the stability of the system and the analog signals being utilized to provide quick response upon the application of transient loads to the system.

The present invention provides a controlled velocity drive for controlling the velocity of a driven load including generating means for generating a constant frequency reference pulse train wherein each incremental pulse is indicative of a desired incremental position of the load and the frequency of the pulses is indicative of the desired velocity of the load, scaling means for scaling the reference pulse train, and sensing means for sensing the actual position and velocity of the load and establishing a second pulse train wherein each pulse is indicative of an actual incremental position of the load and the frequency of the pulses is indicative of the actual velocity of the load. Means are provided for digitally summing the pulses of the reference pulse train and the pulses of the second pulse train and establishing an error signal indicative of position error between the actual position of the load and the desired position of the load. The control system further includes a velocity control means which is responsive to the position error signal for controlling the velocity of the load to bring about and maintain registry of actual load velocity and position with the desired load velocity and position.

The present invention further provides a controlled velocity drive having a driven load and which includes means for generating a constant reference pulse train wherein each pulse is indicative of a desired incremental position of the load and the frequency of the pulses is indicative of a desired velocity of the load and first sensing means for sensing the actual position and actual velocity of the load and generating a second pulse train wherein each pulse is indicative of an actual incremental position of the load and the frequency of the pulses is indicative of the actual velocity of the load. Digital summing means are provided for summing the pulses of the reference pulse train and the pulses of the second pulse train and generating an analog position error signal indicative of the error between the actual position of the load and the desired position of the load. Means are provided responsive to the reference pulse train for generating a reference velocity signal. The controlled velocity drive also includes second sensing means for sensing the actual velocity of the load and generating an analog velocity signal indicative thereof. The analog velocity signal is combined with the reference velocity signal by a compensation circuit which generates an analog compensation signal. Means are provided for combining the analog position error signal, the reference velocity signal and the compensation signal to produce an analog control signal which is directed to a velocity control which controls the velocity of the load in response to the analog control signal so that a zero average error in velocity results between the actual velocity of the load and the desired velocity of the load as is indicated by the reference pulse train.

Accordingly, the present invention provides a new and improved controlled velocity drive for controlling the velocity of a load and maintaining a zero average error in velocity between the desired velocity of the load and the actual velocity of the load. This is effected through the generation of a constant frequency reference pulse train which sets the desired velocity of the load. Three control loops are provided which produce control signals indicative of the position error of the load, the desired velocity of the load, and a compensation signal for stabilizing the control. These three control signals are combined and directed to a velocity drive so as to control the velocity of the load to bring about and maintain registry between the actual load position and velocity with the desired load position and velocity.

DESCRIPTION OF THE DRAWINGS

FIG. 3 is a schematic illustration of one of the pulse processors of the anti-coincidence logic;

FIG. 4 is a truth table for the flip-flops of the anti-coincidence logic;

FIG. 5 is a schematic representation of the mode control;

DESCRIPTION OF THE PREFERRED EMBODIMENT

Figure 1:
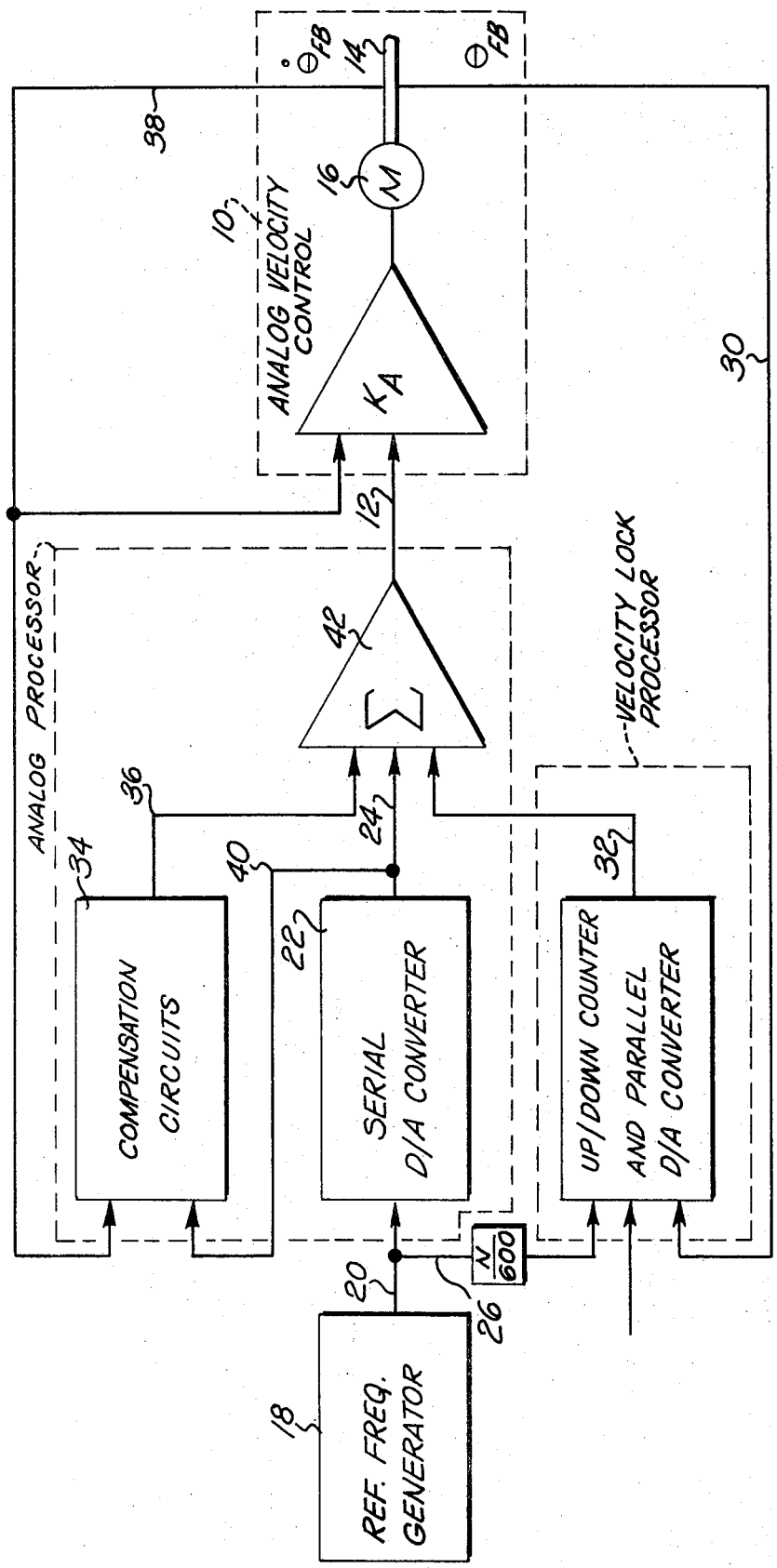
FIG. 1 is a block diagram illustrating the controlled velocity drive.

FIG. 1 schematically illustrates the control for the controlled velocity drive which includes an analog velocity control 10 which may be similar to the analog velocity control disclosed in the aforementioned O'Callaghan U.S. Pat. No. 3,629,633. The analog velocity control is controlled by an input signal on the line 12 which sets the desired speed of a load 14 which is schematically illustrated as the output shaft of a motor 16. A reference fragmentary generator 18 is provided for generating a reference pulse train on its output line 20. The reference pulse train has a frequency which is indicative of the desired velocity of the load 14 and each pulse is indicative of a desired incremental position of the load 14. The reference pulse train is directed along the line 20 to a serial digital to analog (D/A) converter 22 which converts the reference pulse train to an analog base velocity signal which is indicative of the desired velocity of the load 14. The analog base velocity signal is directed on line 24 to an operational amplifier 42.

An encoder, preferably a pulse generator, not illustrated, is connected to the load 14 and establishes a second pulse train on line 30 wherein each pulse is indicative of an actual incremental position of the load and the frequency of the pulse is indicative of the actual velocity of the load. The encoder may take the form of a toothed wheel rotatable with the load 14 and a pulse pickup associated with the wheel. The pickup will be operable to generate a single pulse each time a tooth passes the pickup. Thus, the encoder will generate a specific number of pulses per revolution which number of pulses is determined by the number of teeth on the toothed wheel. Moreover, the frequency of the pulses will be dependent upon the velocity of the load. The reference pulse train is also directed along line 26 to an up-down counter and parallel digital to analog converter 28. The pulses of the reference pulse train on line 26 and the pulses of the second pulse train on line 30 are directed to the up-down counter and parallel D/A converter 28 which acts as a digital summer to sum the pulses of the reference pulse train and the second pulse train to produce an analog position error signal. The digital summer operates as in integrator in that it sums the incremental position pulse and generates a position error signal. Since the frequency of the pulses is indicative of velocity, the summer acts to integrate the velocity to derive the position error signal. It should be appreciated that the frequency of the pulses of the reference pulse train and the second pulse train are scaled such that there will be a correspondence between the pulses of the two pulse trains when the actual velocity of the load corresponds to the desired velocity of the load. This correspondence can generally be a 1:1 correspondence such that if the load is running at the desired velocity then the frequency of pulses of the second pulse train will be equal to the frequency of the pulses of the reference pulse train. If the frequency of pulses is different, this will be sensed by the updown counter and parallel D/A converter 28 and an error signal will be established on line 32 which is indicative of the position error. The position error is the difference between the desired position of the load which is indicated by the reference pulse train and the actual position of the load which is indicated by the second pulse train.

A compensation circuit 34 is provided for generating a compensation signal on line 36 which is utilized to stabilize the control system. To this end, a tachometer generator, not illustrated, is connected with the load 14 and produces an analog voltage on line 38 which is indicative of the actual velocity of the load 14. This actual velocity signal is directed along line 38 to the compensation circuit 34. The output of the serial D/A converter 22 which is indicative of the desired velocity of the load is also directed along a line 40 to the input of the compensation circuit 34. The compensation circuit will then combine the signals indicative of the actual velocity of the load and the desired velocity of the load and generate an analog compensation signal on line 36.

The reference velocity signal on line 24, the analog position error signal on line 32 and the compensation signal on line 36 will be combined by an operational amplifier 42 which will then generate on line 12 an analog control signal which is directed to the analog velocity control 10 for controlling the velocity of the load 14. The control signal directed along the line 14 will be such as to control the velocity of the load so that a zero average error in velocity results over a predetermined period of time.

Figure 2:
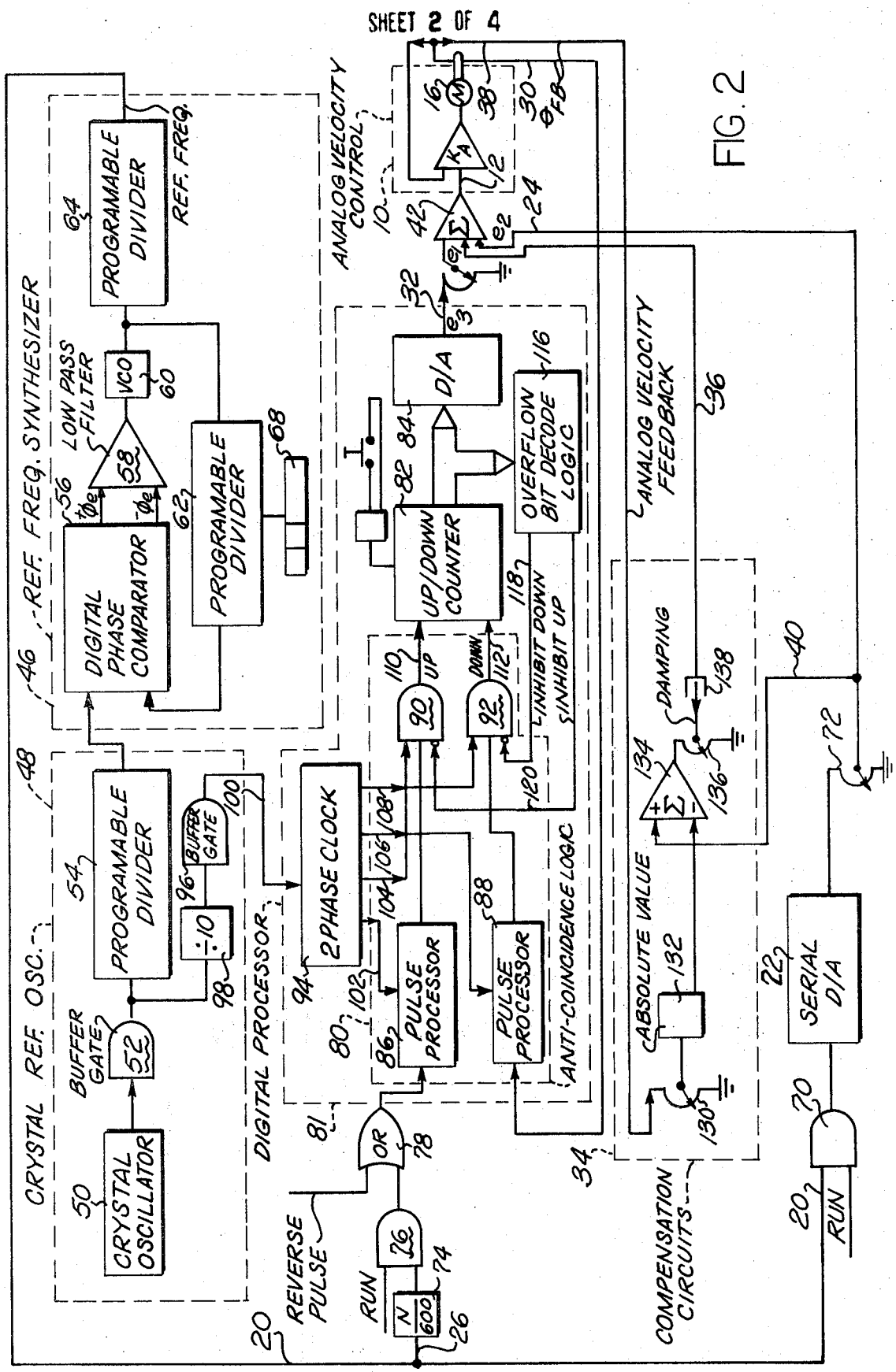
FIG. 2 is a block diagram more fully illustrating the specific components of the controlled velocity drive.

The reference frequency generator 18 is composed of a crystal reference oscillator 48 and a reference frequency synthesizer 46 more fully illustrated in FIG. 2. The crystal reference oscillator 48 generates and scales the reference pulse train and the reference frequency synthesizer 46 scales and locks the generated pulse train to a predetermined accurately controllable frequency. The crystal reference oscillator includes a crystal oscillator 50 which is operable to provide an extremely stable and accurate pulse train at the output thereof. The output of the crystal oscillator 50 is fed through a buffer gate 52 to a programmable divider 54. The buffer gate 52 is provided to eliminate the effect of circuit loading on the frequency and the programmable divider 54 operates as a fixed scaler to scale the frequency generated by the crystal oscillator 50. The output of the programmable divider 54, which is a pulse train of a lesser frequency than that of the pulse train generated by the crystal oscillator 50, is directed to the reference frequency synthesizer 46.

The reference frequency synthesizer 46 includes a digital phase frequency comparator 56, a low pass filter 58, a voltage controlled oscillator 60 and programmable divider 62 which operate to form a phase frequency lock loop. The output of the programmable divider 54 is directed to one input of the digital phase comparator 56. The other input of the digital phase comparator 56 is a feedback signal from the programmable divider 62. The output of the digital phase comparator is indicative of the difference in phases between the output of the programmable divider 54 and the output of the programmable divider 62. The phase error signal from the digital phase comparator 56 is directed through the low pass filter 58 to the voltage controlled oscillator 60 which generates a pulse train whose frequency is dependent upon the input voltage to the voltage controlled oscillator 60.

The digital phase comparator 56 acts to compare the phase of the frequency from the programmable divider 54 of the crystal reference oscillator 48 with the phase of the feedback frequency from the programmable divider 62. If the phase of the frequency from the programmable divider 54 is greater than the phase of the frequency from the programmable divider 62 then the net phase error will be positive. If the phase of the programmable divider 62 is greater than the phase of the programmable divider 54 then the net phase error will be negative. The phase error signal is directed to the low pass filter 58 which converts the digital phase error signal to an analog voltage proportional to the phase error. The analog voltage from the low pass filter 58 then drives the voltage control oscillator 60 whose output is directed to programmable divider 64 and programmable divider 62. The programmable divider 62 which forms the feedback for the phase lock loop includes a plurality of thumb switches 68 for setting the scaling factor of the programmable divider 62 to thereby control the output frequency from the phase lock loop. The phase lock loop operates to lock the output frequency phase to the frequency phase of the crystal oscillator so that the freuqency generated by the voltage controlled oscillator 60 equals the frequency output of the programmable divider 54 times the scaling factor of the programmable divider 62. The output of the voltage controlled oscillator 60 is directed to the programmable divider 64 which further scales the reference pulse train and generates the reference frequency for the control system on line 20. The reference pulse train on line 20 has a frequency indicative of the desired velocity of the load and each incremental pulse is indicative of a desired incremental position of the load.

The reference frequency on line 20 is directed through an AND gate 70 to the serial D/A converter 22. The AND gate 70 is controlled by the control logic discussed more fully hereinbelow. The reference pulse train is converted by the serial D/A converter 22 to an analog voltage having a magnitude which is proportional to the frequency of the reference pulse train and thus proportional to the desired velocity of the load. The output of the serial D/A converter 22 is directed through a velocity tracking potentiometer 72 to the line 24 and to the amplifier 42. The velocity tracking potentiometer 72 operates to calibrate the analog output voltage from the serial D/A converter 22 so that the analog voltage matches the desired reference voltage of the analog velocity control 10. The analog signal on line 24 has a magnitude which is indicative of the desired velocity of the load 14 and which is dependent upon the frequency of the reference pulse train. The analog signal on line 24 can be conveniently referred to as the base velocity reference signal.

The reference frequency on line 20 is also directed to a digital processor 81 whose output signal on line 32 is indicative of the position error between the desired position of the load 14 and the actual position of the load 14. The digital processor includes anti-coincidence logic 80 and a binary up-down counter 82 whose output is directed through a digital analog converter 84 which converts the digital output of the up-down counter 82 to an analog reference signal whose magnitude is proportional to position error. The reference frequency is directed along line 20 to line 26 through a scaler 74 which scales the reference frequency to a frequency which is compatible with the output frequency of the encoder. The output of the scaler 74 is directed to an AND gate 76, which is controlled by the mode control logic, discussed hereinbelow, through an OR gate 78 to the anti-coincidence logic 80. The OR gate 78 functions to accommodate reverse pulses in the event the load should move in a reverse direction.

The anti-coincidence logic 80 includes a pair of pulse processors 86 and 88 which respectively receive pulses from the reference pulse train and the encoder. As discussed hereinabove, the encoder is attached to the load 14 and produces a pulse train wherein each individual pulse is indicative of an actual incremental position of the load and the frequency of the pulses is indicative of the actual velocity of the load. Generally, it is desired that when the load is travelling at the desired velocity the encoder will produce one output pulse for every pulse of the reference pulse train. Thus, the scaling factor of the scaling block 74 is determined by the number of output pulses that the encoder generates for a given movement of the load.

The pulse train from the encoder will be directed along the line 30 to the pulse processor 88 of the anti-coincidence circuit. The reference pulse train after it is scaled by the scaler 74 will be directed through the AND gate 76 and the OR gate 78 to the pulse processor 86. The pulse processors 86 and 88 cooperate with the AND gates 90 and 92 to form the anti-coincidence logic which prevents two pulses from the encoder and the reference pulse train from simultaneously being entered into the up-down counter 82. The anti-coincidence logic further includes a two phase clock and decoding logic. The two phase clock 94 is preferably in the form of a Johnson counter which is driven by the crystal oscillator 50 via a divider 98 and a buffer gate 96. Thus, the input on line 100 to the Johnson counter will be a constant frequency pulse train which is proportional to the output of the crystal oscillator 50.

The two phase clock and encoder circuitry 94 insures that no clock phase overlaps any other clock phases and provides sequential signals for processing the pulses to the up-down counter 82. The two phase clock and decoder circuitry 94 is operable to emit a series of pulses sequentially on the outputs 102, 104, 106 and 108 thereof. The output 102 is connected to the pulse processor 86 and the output 104 is connected to a terminal of the AND gate 90. An output signal on line 102 of the two phase clock and decoder 94 sets the pulse processor 86 in a condition to receive and process a pulse from the reference pulse train and a signal on the line 104 conditions the AND gate 90 to enable the pulse processor 86 to direct a pulse through the AND gate 90 to the up-count terminal 110 of the binary up-down counter 82.

The output terminal 106 of the two phase clock and decoder circuitry 94 is connected to the pulse processor 88 and the output terminal 108 is connected to the AND gate 92. An output pulse on the output terminal 106 sets the pulse processor 88 in a condition to receive and process a pulse from the second pulse train generated by the encoder and a pulse on output terminal 108 conditions the AND gate 92 to enable the pulse processor 88 to direct a pulse through the AND gate 92 to the down-count terminal 112 of the binary up-down counter 82. Thus, the output pulses on the terminals 102 and 106 of the two phase clock and decoder circuitry 94 set up the pulses in the pulse processors 86 and 88 respectively and pulses on the output terminals 104 and 108 condition the AND gates 90 and 92 respectively to enable the pulses to go through the AND gates 90 and 92 to the up and down count terminals 110 and 112 respectively of the binary up-down counter 82. The operation of the pulse processors 86 and 88 is more fully described hereinbelow but it should be apparent that the pulse processors 86 and 88 form an integral part of the anti-coincidence logic 80 to prevent the simultaneous occurrence of up and down counts on the up and down terminals of the binary up-down counter 82.

The output of the up-down counter 82 is in digital form and is a digital number which is proportional to the time integral of the difference between the frequencies of the reference and second pulse train. The time integral of the difference between the frequencies of the two pulse train, which is the integral of the velocity error, is a scaled position error signal which is indicative of the difference between the desired position of the load 14 as is indicated by the reference pulse train and the actual position of the load 14 as is indicated by the second pulse train. The digital output of the up-down counter 82 is directed to a digital to analog converter 84. The D/A converter 84 converts the digital data from the up-down counter 82 to an analog voltage which is proportional to the position error between the desired position of the load and the actual position of the load. This output voltage is scaled through a trim potentiometer 114 and directed to an input terminal of the amplifier 42.

An overflow bit decode logic circuitry 116 is associated with the up-down counter 82 to prevent the up-down counter from resetting to its zero condition in the event the counter should count to and exceed its limit. If it is assumed that the up-down counter 82 is an eight bit counter the overflow bit decode logic monitors the counter output and inhibits the upcount at 01111111 and inhibits the down count at 1000000. The overflow bit decode logic 116 includes an inhibit down-count output terminal 118 which is connected to the inhibit terminal of the AND gate 92 and an inhibit up-count terminal 120 which is connected to the inhibit terminal of the AND gate 90. When the counter 82 reaches its maximum up-count, a signal will be applied by the output terminal 120 of the overflow bit decode logic to the inhibit terminal of the AND gate 90 to prevent further upcounts from being entered in the counter 82 as long as the count in the counter 82 remains at its maximum. When the counter 82 reaches its maximum down count a signal will be applied by the output terminal 118 of the overflow bit decode logic to the inhibit terminal of the AND gate 92 to prevent further down counts from being entered in the counter 82 as long as the count in the counter 82 remains at its maximum.

The count in the up-down counter 82 is indicative of position error between the actual position of the load and the desired position of the load which is indicated by the reference pulse train. Accordingly, the error signal from the up-down counter is indicative of position error which is effected by velocity error. Accordingly, correction of velocity error will not necessarily correct the position error. If it is assumed that the load 14 is a rotating shaft and the velocity thereof slows down so that the position of the shaft is 20° behind the desired position of the shaft and then the velocity of the shaft is brought up to the desired velocity, the shaft will still lag 20° behind the desired position as is indicated by the reference pulse train. Accordingly, the count in the counter 82 is indicative of this lag in position even though the velocity might now be brought up to the desired velocity. The counter 82 acts as a memory for the system to enable the system to make up the lost position which is indicated by the count in the counter 82. Thus, the system is operable to speed up for a short period of time to bring the actual position of the shaft up 20° so that it now coincides with the desired position of the shaft as is indicated by the reference pulse train.

A reset logic circuit is associated with the up-down counter 82 to reset the counter to an initial zero count during start up. The reset logic circuit includes a reset flip-flop 91 and a switch 92 which when activated activates the flip-flop 91. Activation of the flip-flop 91 sets the counter 82 to zero by grounding all of the data inputs to the counter 82. The reset circuit is generally activated during power up of the control system and may, if desired, be automatically controlled by the mode control logic which is more fully described hereinbelow.

The pulse processor 86 and 88 are shown schematically in FIG. 3. For the purposes of explanation, only one of the pulse processors, pulse processor 86, will be discussed in detail and it should be apparent that the operation of the other pulse processor 88 is analogous to that of the pulse processor 86. Moreover, in the explanation of the operation of the pulse processor 86 the truth table, illustrated in FIG. 4, should be considered which illustrates the condition of the flip-flops of the pulse processor 86 with different inputs thereon. The $Q_N + 1$ notation in the truth table denotes the condition of the Q output terminal of the flip-flop at the end of the next clock pulse.

The pulse processor 86 includes a pair of flip-flops 122 and 124. The flip-flop 122 receives clock pulses from the output terminal 102 of the two phase clock 94 on the input terminal C1 and pulses from the output of OR gate 78, which are pulses of the reference pulse train, on the input terminal J1. To insure proper operation the duration of pulses of the reference pulse train is much greater than the duration of the clock pulses applied to terminal C1. Thus, the frequency of the clock pulses is much greater than the frequency of the reference pulse train. The output terminal Q1 of flip-flop 122 is connected to an input terminal of the AND gate 90 along with the output terminal 104 of the two phase clock 94. The input terminal 120 of the AND gate 90 is an inhibit terminal which is associated with the overflow bit decode logic 116. When Q1 is high and a clock pulse is entered on the terminal 104 and no inhibit signal is on terminal 120, an output from the AND gate 90 will be generated on the terminal 110 to cause an up count to be entered in the up-down counter 82.

If it is assumed that all of the inputs and outputs to the flip-flops 122 and 124 are low at an initial condition the following sequence will occur. At time $T_0$, Q1, Q2 and J1 are low which means that K1 will also be low. Moreover, at time $T_0$, $\overline{Q2}$ is high. At time $T_1$ a pulse will be entered in terminal J1 causing J1 to be high. However, K1, $Q_1$, and $Q_2$ will remain low while $\overline{Q_2}$ will remain high. The pulse applied to terminal J1 will also be applied to terminal CL2 of flip-flop 124 to remove the clear on flip-flop 124. At time $T_2$ a clock pulse will be applied to terminal $C_1$ of flip-flop 122. The application of a clock pulse to terminal $C_1$ will cause $Q_1$ to go high. This should be apparent from the truth table in FIG. 4 as at this particular point in time J1 is high, K1 is low and Q1 will go high upon the application of the clock pulse. When Q1 goes high, a high input will be applied to the input of the AND gate 90. The next clock pulse acting on the pulse processor 86 will be applied from the output terminal 104 of the two phase clock 94 to condition the AND gate 90 to cause a pulse to be applied to the output 110 of the AND gate 90 due to the fact that the Q1 input thereof is high and no inhibit pulses are applied to the inhibit terminal 120. A high on terminal Q1 of flip-flop 122 will not effect the low on Q2 and the high condition of $\overline{Q2}$. At time $T_3$ another clock pulse will be applied to terminal C1. Since K1 is high, $Q_1$ will go low in response to the clock pulse on terminal C1, preventing any further pulses from being applied through AND gate 90. When Q1 goes low, K1 will also go low and a pulse will also be applied to the terminal C2 of flip-flop 124. The application of a pulse to terminal C2 of flip-flop 124 will cause Q2 to go high as J2 is high due to the previous high of $\overline{Q2}$ terminal. When Q2 goes high, K2 will go high and $\overline{Q2}$ will go low thereby applying a low to terminals CL1 of flip-flop 122 to clear flip-flop 122. It should be apparent that the pulse processors or anti-coincidence logic formed by the flip-flops 122 and 124 enables a pulse to be applied to the up terminal 110 of the up-down counter 82 only in accordance with the control pulses applied to the pulse processor by the two phase clock 94. Moreover, it should be appreciated that the flip-flop 124 acts as a resetting flip-flop for the flip-flop 122. Thus, the anti-coincidence logic 86 is placed ahead of the up-down counter 82 to eliminate the ambiguous condition that occurs if "up" and "down" count pulses occur simultaneously. The pulse processor accomplishes this by providing one synchronized pulse for each input pulse. This insures that up and down pulses cannot be coincident in that only one pulse of either is issued for each input pulse.

The compensation circuit 34, more fully illustrated in FIG. 2, includes an absolute value circuit 132 and an operational amplifier 134. The analog velocity feedback is directed from the tachometer generator along line 38 through a velocity trim potentiometer 130 to an absolute value circuit 132. The absolute value circuit 132 converts the AC signal from the tachometer generator to a DC voltage which is proportional to the actual velocity of the load 14. This signal is directed to the inverting input of the operational amplifier 134. The base velocity signal from line 24 is applied to the positive input terminal of the operational amplifier 134, via line 40. Thus, the compensation signal appearing at the output terminal of the operational amplifier 134 is a velocity error signal which represents the difference between the actual velocity sensed by the tachometer generator and the desired velocity sensed from the based velocity signal on line 24. The velocity error signal is applied through a damping circuit comprising the potentiometer 136 and the capacitor 138. The capacitor 138 and potentiometer 136 of the damping circuit operate to differentiate the velocity error to provide an acceleration signal which is applied along line 36. The acceleration signal on line 36 is applied to the operational amplifier 42 and acts to stabilize the system.

It should be appreciated that the operational amplifier 142 has three signals applied thereto. The signals are a compensation signal which is the derivative of the velocity error between the actual velocity of the load and the desired velocity of the load, a base velocity signal indicative of the desired velocity of the load and a position error signal indicative of the difference between the actual position of the load and the desired position of the load. The operational amplifier 42 operates on the signals to produce an analog voltage on line 12 which is fed to the analog velocity control 10 to drive the load 14 in response to the signal on line 12.

The signal appearing on line 12 and applied to the analog velocity control 10 controls the velocity of the load 14 so that a zero average error in velocity results. The control system yields a perfect velocity control in that a zero average error in velocity can be maintained. The dynamic velocity and position errors of the system are functions of mechanical constraints of the system such as the torque to inertia ratio and load torque applications. The system is also operable as a position system in that the signal applied to the analog velocity control will act to minimize position error but will not yield a zero average position error. The position control which the system is capable of maintaining is a function of the gain of the system. The greater the gain, the greater the position control that can be maintained. If the gain of the system were infinite, a zero position error control would result. However, infinite gain would lead to an unstable system. The control system due to its versatility lends itself to many different types of applications due to its operation as a position system and a velocity system. One such application would be the utilization of the present system with an eddy current drive such as disclosed in the above mentioned O'-Callaghan patent. However, the system could be used with a DC drive, a variable or adjustable frequency drive or other types of analog velocity controls with only slight modifications to provide adequate compensation for stabilization.

The mode control circuitry illustrated in FIG. 5, is an auxiliary function which programs the system operation. As discussed hereinabove, certain of the gates such as AND gates 70 and 76 are programmed by the mode control depending on the system operation. The mode control can program into the system such control operations as stopping, running, accelerating, etc. The mode control as disclosed in FIG. 5 includes a mode control clock 140 which includes operating buttons for initiating a particular mode of operation of the control system. The output of the clock is connected through a plurality of binary switches 141, 143 and 145 which respectively set the run speed, thread speed and stop speed of the machine. The output of the switches is connected through diode matrices 147 to the reference frequency synthesizer to program the reference frequency synthesizer to produce the correct reference frequency during the different modes of operation of the machine. The mode control is also operable to gate the reference frequency on and off and provides a means of processing reverse pulses from a direction sensitive pick up so that the up-down counter 82 can retain relative drive positions in the event that a reversal in the drive occurs.

Figure 6:
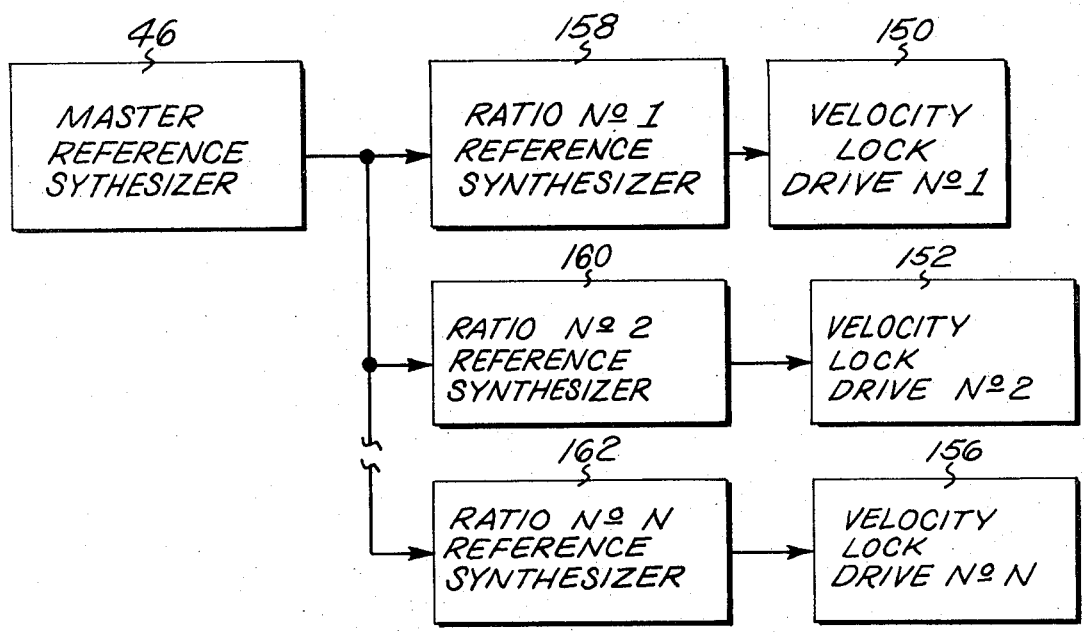
FIG. 6 is a schematic block diagram of the means for generating the reference frequencies for a plurality of drive units connected in a parallel relationship.
Figure 7:
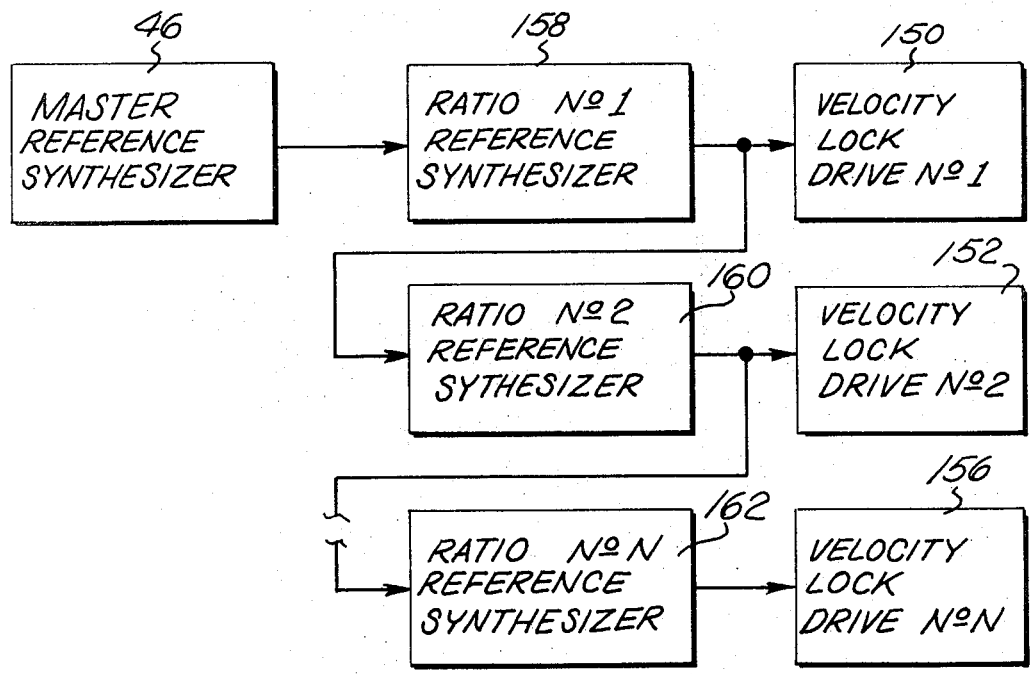
FIG. 7 is a schematic block diagram of the means for generating the reference frequencies for a plurality of drive units connected in a series relationship.

FIGS. 6 and 7 disclose the configuration of the reference frequency synthesizers when the controlled velocity drive is utilized with a plurality of drive units. In FIG. 6 the drive units are arranged in a parallel relationship and include drive units 150, 152 and 156 which are respectively associated with the reference frequency synthesizers 158, 160 and 162. When the parallel connections are utilized, it will be apparent that the same reference frequency will be applied from the master reference synthesizer 46 to each of the reference synthesizers 158, 160 and 162. The frequency will be the same for all of the synthesizers. The reference synthesizers 158, 160 and 162 will then scale the master frequency from the master reference synthesizer 46 so that it is correct for each of the drive units 150, 152 and 156. In this way each of the drive units will have a frequency applied thereto which is dependent upon the master reference synthesizer 146 and the reference synthesizer associated with each of the individual drive units.

In FIG. 7 a series connection is utilized between the reference synthesizers 158, 160 and 162. In this way, the master reference synthesizer 46 will direct a frequency to the reference synthesizer 158 which will scale that frequency and direct that frequency to the controlled drive 150. The frequency that is applied to the controlled drive will also be applied to the reference synthesizer 160. The reference synthesizer 160 is then operable to scale the frequency applied to it and direct it to the velocity lock drive 152. The frequency applied to the drive 152 will also be applied to the reference synthesizer 162. The reference synthesizer 162 will then scale the frequency again and apply it to the controlled drive 156. It should be apparent that the frequency which is applied to the controlled drive 152 in FIG. 7 will be dependent upon the scaling factor of the reference synthesizer 158 and the scaling factor of the reference synthesizer 160. Moreover, the frequency applied to the controlled drive 156 will be dependent upon the scaling factors of the reference synthesizers 158, 160 and 162. This series connection of the reference synthesizers provides an operation such that if the ratio is changed on one of the synthesizers then the frequency applied to any of the controlled drives which follow that synthesizer will also be changed.

From the foregoing, it should be apparent that a new and improved controlled velocity drive has been provided which is operable to control the velocity of a driven load so that the average error in velocity is zero. The present invention utilizes a reference frequency generator which generates a stable reference frequency in the form of a pulse train which may be scaled so that each individual pulse is indicative of a desired position of the load and the frequency of the pulses is indicative of the desired velocity of the load. The reference pulse train is directed to a serial digital to analog converter which takes the digital reference pulse train and generates a reference analog voltage which has a magnitude indicative of the desired velocity of the load. The reference pulse train is also directed to an up-down counter via an anti-coincidence logic. The up-down counter has associated therewith a feedback loop which has a pulse train generated thereon from an encoder attached to the load wherein the pulses of the pulse train generated by the encoder are indicative of actual positions of the load and the frequency of the pulse train is indicative of the actual velocity of the load. The up-down counter acts as a digital summer and generates a position error signal which is indicative of the difference between the actual position of the load and the desired position of the load indicated by the reference pulse train. A compensation circuit is also provided which senses the difference between the desired velocity of the load which is indicated by the reference pulse train and the actual velocity of the load which is sensed by a tachometer generator and generates an analog velocity error signal which is differentiated to generate an acceleration signal which is used to stabilize the control. The analog velocity error signal, the base velocity signal, and the position error signal are summed by an operational amplifier and directed to an analog velocity control which controls the velocity and the position of the load in response to the analog control signal. It should be apparent that while the present invention provides an extremely accurate controlled velocity drive wherein the net average error in velocity is zero the system can also be utilized as a position sensing system in that the output of the up-down counter is indicative of position error and acts to maintain the actual position of the load in correspondence with the desired position of the load.

What we claim is:

1. A control for a controlled velocity drive having a driven load comprising generating means for generating a reference pulse train wherein each incremental pulse is indicative of a desired incremental position of the load and the frequency of the reference pulses is indicative of a desired velocity of the load, sensing means for sensing the actual position and velocity of the load and establishing a second pulse train wherein each incremental pulse is indicative of an actual position of the load and the frequency of the pulses is indicative of the actual velocity of the load, digital summing means for summing pulses of the reference pulse train and the pulses of the second pulse train for generating a position error signal indicative of the potential error between the actual position of the load and the desired position of the load, velocity control means responsive to said error signal for varying the velocity of the load to drive the load substantially at said desired velocity and compensation circuit means for generating a compensation1signal for stabilizing said system, such compensation circuit means including means for generating an acceleration compensation signal and means for directing said acceleration compensation signal to said velocity control means to effect stabilization of said system.

2. A control for a controlled velocity drive as defined in claim 1 wherein said generating means includes a crystal oscillator for generating a constant frequency pulse train and means for scaling said constant frequency pulse train.

3. A control for a controlled velocity drive having a driven load comprising generating means for generating a reference pulse train wherein each incremental pulse is indicative of a desired incremental position of the load and the frequency of the reference pulses is indicative of a desired velocity of the load, sensing means for sensing the actual position and velocity of the load and establishing a second pulse train wherein each incremental pulse is indicative of an actual position of the load and the frequency of the pulse is indicative of the actual velocity of the load, digital summing means for summing pulses of the reference pulse train and the pulses of the second pulse train for generating a position error signal indicative of the positional error between the actual position of the load and the desired position of the load, and velocity control means responsive to said error signal for varying the velocity of the load to drive the load substantially at said desired velocity, said generating means including a crystal oscillator for generating a constant frequency pulse train and means for scaling said constant frequency pulse train, said generating means further including a digital phase comparator responsive to said scaled constant frequency pulse train, a voltage controlled oscillator for generating said reference pulse train, and a feedback loop from the output of said voltage controlled oscillator to said digital phase comparator, said feedback loop including a programmable divider therein for scaling the feedback signal to said digital phase comparator operating to compare the phase of said scaled constant frequency pulse train and the phase of said feedback signal from said voltage controlled oscillator as scaled by said programmable divider and generating a phase error signal indicative of phase error between the phase of said scaled constant frequency pulse train and said feedback signal, said phase error signal driving said voltage controlled oscillator to generate said reference pulse train at the output thereof.

4. A control for a controlled velocity drive as defined in claim 3, wherein said generating means further including a further programmable divider connected to the output of said voltage controlled oscillator for scaling said reference pulse train.

5. A control for a controlled velocity drive having a driven load comprising generating means for generating a reference pulse train wherein each incremental pulse is indicative of a desired incremental position of the load and the frequency of the reference pulses is indicative of a desired velocity of the load, sensing means for sensing the actual position and velocity of the load and establishing a second pulse train wherein each incremental pulse is indicative of an actual position of the load and the frequency of the pulses is indicative of the actual velocity of the load, digital summing means for summing pulses of the reference pulse train and the pulses of the second pulse train for generating a position error signal indicative of the positional error between the actual position of the load and the desired position of the load, velocity control means responsive to said error signal for varying the velocity of the load to drive the load substantially at said desired velocity, said digital summing means comprising an up-down counter having an up count input terminal and a down count input terminal, one of said input terminals having pulses indicative of the frequency of said reference pulse train applied thereto and the other of said terminals having pulses indicative of the frequency of said second pulse train applied thereto, said up-down counter having a count established therein which is indicative of positional error between the actual position of the load and the desired position of the load and operating to generate said position error signal and anti-coincidence logic means associated with said up-down counter for preventing coincident up and down pulses from being simultaneously applied to said up and down count input terminals of said up-down counter, said anti-coincidence logic including a first pulse processor having its input connected to said reference pulse train, first gate means associated with said first pulse processor and having its output connected to one of said input terminals of said up-down counter, a second pulse processor having its input associated with said second pulse train, second gate means associated with said second pulse processor and having its output connected to the other of said input terminals of said up-down counter and clock means for sequentially activating said first and second pulse processors and said first and second gate means for effecting the sequential application of said up and down counts to said up-down counter and preventing the simultaneous application of coincident pulses to said up and down count input terminals of said up-down counter.

6. A control for a controlled velocity drive as defined in claim 5 further including overflow bit decode logic means associated with said up-down counter and including an inhibit down count output terminal connected to one of said gate means and an inhibit up count output terminal connected to the other of said gate means, said overflow bit decode logic means inhibiting the application of pulses to said input terminals of said up-down counter when said counter reaches a predetermined maximum or minimum count to prevent said counter from overflowing and returning to its zero count condition upon the application of a pulse to one of said input terminals, said overflow bit decode logic means inhibiting the application of pulses to said up-down counter by inhibiting the gate means associated with said input terminal of said up-down counter upon which the application of a pulse thereto would effect overflow of said up-down counter.

7. A control for a controlled velocity drive as defined in claim 1 wherein said control further includes second sensing means for sensing the actual velocity of the load, said compensation circuit means including means for comparing the desired velocity of the load as indicated by said reference pulse train and the actual velocity of the load as sensed by said second sensing means and generating a velocity error signal indicative of the difference between said actual velocity and said desired velocity of the load.

8. A control for a controlled velocity drive as defined in claim 7 wherein said compensation circuit further includes means for differentiating said velocity error signal and generating an acceleration compensation signal which is directed to said velocity control means to effect stabilization of said system.

9. A control for a controlled velocity drive as defined in claim 8 further including means responsive to said reference pulse train for generating a velocity reference signal which is indicative of the desired velocity of the load and which is directed to said velocity control means.

10. A control for a controlled velocity drive as defined in claim 7 wherein said sensing means includes encoder means associated with the load, said encoder means operating to generate said second pulse train wherein each pulse is indicative of a predetermined amount of movement of the load and is thereby indicative of a predetermined incremental position of the load and the frequency of pulses is indicative of the velocity of the load.

11. A control for a controlled velocity drive as defined in claim 10 wherein said second sensing means comprise a tachometer generator associated with the load.

12. A control for a controlled velocity drive having a driven load comprising generating means for generating a reference pulse train having a frequency which is indicative of the desired velocity of the load, sensing means for sensing the actual velocity of the load and generating an analog velocity signal indicative thereof, means for converting said reference pulse train into an analog velocity voltage signal which is indicative of the desired velocity of the load, comparator means for comparing said analog velocity signal which is indicative of the desired velocity of the load with said analog signal indicative of the actual velocity of the load and generating an analog velocity error signal, means for differentiating said analog velocity error signal to generate an analog acceleration compensation signal, means for combining said analog acceleration compensation signal and said analog velocity signal indicative of the desired velocity of the load to produce an analog control signal and velocity control means responsive to said analog control signal for bringing about and maintaining correspondence between the desired vlocity of the load and the actual velocity of the load so that a zero average error in velocity results over a predetermined period of time.

13. A control for a controlled velocity drive as defined in claim 12 wherein said generating means includes a crystal oscillator for generating a constant frequency pulse train means for scaling said constant frequency pulse train.

14. A control for a controlled velocity drive as defined in claim 13 wherein said generating means further includes a digital phase comparator responsive to said scaled constant frequency pulse train, a voltage controlled oscillator for generating said reference pulse train, and a feedback loop from the output of said voltage controlled oscillator to said digital phase comparator, said feedback loop including a programmable divider therein for scaling the feedback signal to said digital phase comparator, said digital phase comparator operating to compare the phase of said scaled constant frequency pulse train and the phase of said feedback signal from said voltage controlled oscillator as scaled by said programmable divider and generating a phase error signal indicative of phase error between the phase of said scaled constant frequency pulse train and said feedback signal, said phase error signal driving said voltage controlled oscillator to generate said reference pulse train at the output thereof.

15. A control for a controlled velocity drive as defined in claim 14 wherein said generating means further including a further programmable divider connected to the output of said voltage controlled oscillator for scaling said reference pulse train.

16. A control for a controlled velocity drive as defined in claim 12 wherein said sensing means for sensing the actual velocity of the load comprises a tachometer generator.

17. A control for a controlled velocity drive having a driven load comprising generating means for generating a reference pulse train wherein each incremental pulse is indicative of a desired incremental position of the load, sensing means for sensing the actual position of the load and establishing a second pulse train wherein each incremental pulse is indicative of an actual position of the load, digital summing means for summing said pulses of said reference pulse train and said pulses of said second pulse train for generating a position error signal indicative of the positional error between the actual position of the load and the desired position of the load, velocity control means responsive to said position error signal for varying the velocity of the load to bring about and maintain registry between the actual position of the load and the desired position of the load and compensation circuit means for generating a compensation signal for stabilizing said system, said compensation circuit means including means for generating an acceleration compensation signal and means for directing said acceleration compensation signal to said velocity control means to effect stabilization of said system.

18. A control for a controlled velocity drive as defined in claim 17 wherein said generating means includes a crystal oscillator for generating a constant frequency pulse train and means for scaling said constant frequency pulse train.

19. A control for a controlled velocity drive having a driven load comprising generating means for generating a reference pulse train wherein each incremental pulse is indicative of a desired incremental position of the load, sensing means for sensing the actual position of the load and establishing a second pulse train wherein each incremental pulse is indicative of an actual position of the load, digital summing means for summing said pulses of said reference pulse train and said pulses of said second pulse train for generating a position error signal indicative of the positional error between the actual position of the load and the desired position of the load, and velocity control means responsive to said position error signal for varying the velocity of the load to bring about and maintain registry between the actual position of the load and the desired position of the load, said generating means including a crystal oscillator for generating a constant frequency pulse train and means for scaling said constant frequency pulse train, said generating means further including a digital phase comparator responsive to said scaled constant frequency pulse train, a voltage controlled oscillator for generating said reference pulse train, and a feedback loop from the output of said voltage controlled oscillator to said digital phase comparator, said feedback loop including a programmable divider therein for scaling the feedback signal to said digital phase comparator, said digital phase comparator operating to compare the phase of said scaled constant frequency pulse train and the phase of said feedback signal from said voltage controlled oscillator as scaled by said programmable divider and generating a phase error signal indicative of phase error between the phase of said scaled constant frequency pulse train and said feedback signal, said phase error signal driving said voltage controlled oscillator to generate said reference pulse train at the output thereof.

20. A control for a controlled velocity drive as defined in claim 19 wherein said generating means further including a further programmable divider connected to the output of said voltage controlled oscillator for scaling said reference pulse train.

21. A control for a controlled velocity drive having a driven load comprising generating means for generating a reference pulse train wherein each incremental pulse is indicative of a desired incremental position of the load, sensing means for sensing the actual position of the load and establishing a second pulse train wherein each incremental pulse is indicative of an actual position of the load, digital summing means for summing said pulses of said reference pulse train and said pulses of said second pulse train for generating a position error signal indicative of the positional error between the actual position of the load and the desired position of the load, velocity control means responsive to said position error signal for varying the velocity of the load to bring about and maintain registry between the actual position of the load and the desired position of the load, said digital summing means comprising an up-down counter having an up count input terminal and a down count input terminal, one of said input terminals having pulses indicative of the frequency of said reference pulse train applied thereto and the other of said terminals having pulses indicative of the frequency of said second pulse train applied thereto, said up-down counter having a count established therein which is indicative of positional error between the actual position of the load and the desired position of the load and operating to generate said position error signal and anti-coincidence logic means associated with said up-down counter for preventing coincident up and down pulses from being simultaneously applied to said up and down count input terminals of said up-down counter, said anti-coincidence logic including a first pulse processor having its input connected to said reference pulse train, first gate means associated with said first pulse processor and having its output connected to one of said input terminals of said up-down counter, a second pulse processor having its input associated with said second pulse train, second gate means associated with said second pulse processor and having its output connected to the other of said input terminals of said up-down counter and clock means for sequentially activating said first and second pulse processors and said first and second gate means for effecting the sequential application of said up and down counts to said up-down counter and preventing the simultaneous application of coincident pulses to said up and down count input terminals of said up-down counter.

22. A control for a controlled velocity drive as defined in claim 21 further including overflow bit decode logic means associated with said up-down counter and including an inhibit down count output terminal connected to one of said gate means and an inhibit up count output terminal connected to the other of said gate means, said overflow bit decode logic means inhibiting the application of pulses to said input terminals of said up-down counter when said counter reaches a predetermined maximum or minimum count to prevent said counter from overflowing and returning to its zero count condition upon the application of a pulse to one of said input terminals, said overflow bit decode logic means inhibiting the application of pulses to said up-down counter by inhibiting the gate means associated with said input terminal of said up-down counter upon which the application of a pulse thereto would effect overflow of said up-down counter.

23. A control for a controlled velocity drive as defined in claim 17 wherein said control further includes second sensing means for sensing the actual velocity of the load and said reference pulse train has a frequency which is indicative of the desired velocity of the load, said compensation circuit means including means for comparing the desired velocity of the load as indicated by said reference pulse train and the actual velocity of the load as sensed by said second sensing means and generating a velocity error signal indicative of the difference between said actual velocity and said desired velocity of the load.

24. A control for a controlled velocity drive as defined in claim 23 wherein said compensation circuit further includes means for differentiating said velocity error signal and generating an acceleration compensation signal which is directed to said velocity control means to effect stabilization of said system.

25. A control for a controlled velocity drive as defined in claim 24 further including means responsive to said reference pulse train for generating a velocity reference signal which is indicative of the desired velocity of the load and which is directed to said velocity control means.

26. A control for a controlled velocity drive as defined in claim 25 wherein said sensing means includes encoder means associated with the load, said encoder means operating to generate said second pulse train wherein each pulse is indicative of a predetermined amount of movement of the load and is thereby indicative of a predetermined incremental position of the load and the frequency of pulses in indicative of the velocity of the load.

27. A control for a controlled velocity drive as defined in claim 26 wherein said second sensing means comprise a tachometer generator associated with the load.

28. A control for a controlled velocity drive having a driven load, said control comprising generator means for generating a reference pulse train of a constant reference frequency which frequency is indicative of the desired velocity of the load and wherein each pulse is indicative of a desired incremental position of the load, means for modifying the frequency of said reference pulse train to vary the desired velocity of the load, sensing means for sensing the actual position and velocity of the load and establishing a second pulse train wherein each pulse is indicative of an actual incremental position of the load and the frequency of the pulses is indicative of the actual velocity of the load, digital summing means for summing the pulses of said reference pulse train and the pulses of said second pulse train for generating a position error signal indicative of a difference between the desired incremental position of the load as indicated by the reference pulse train and the actual incremental position of the load as indicated by the second pulse train, said pulses of said first and second pulse trains having a predetermined correspondence when the actual velocity of the load is equal to the desired velocity of the load, means responsive to said constant reference frequency for establishing a velocity signal which is indicative of the desired velocity of the load, means responsive to said position error signal and said velocity signal for deriving an analog output signal, vvelocity control means responsive to said analog output signal for controlling the velocity of the load so that a zero average error in velocity results between the actual velocity and the desired velocity of the load as is indicated by the frequency of said reference pulse train, compensation circuit means for generating a compensation signal for stabilizing said system, and means for applying said compensation signal to said velocity control means.

29. A control for a controlled velocity drive as defined in claim 28 wherein said generating means includes a crystal oscillator for generating a constant frequency pulse train and means for scaling said constant frequency pulse train.

30. A control for a controlled velocity drive having a driven load, said control comprising generator means for generating a reference pulse train of a constant reference frequency which frequency is indicative of the desired velocity of the load and wherein each pulse is indicative of a desired incremental position of the load, means for modifying the frequency of said reference pulse train to vary the desired velocity of the load, sensing means for sensing the actual position and velocity of the load and establishing a second pulse train wherein each pulse is indicative of an actual incremental position of the load and the frequency of the pulses is indicative of the actual velocity of the load, digital summing means for summing the pulses of said reference pulse train and the pulses of said second pulse train for generating a position error signal indicative of a difference between the desired incremental position of the load as indicated by the reference pulse train and the actual incremental position of the load as indicated by the second pulse train, said pulses of said first and second pulse trains having a predetermined correspondence when the actual velocity of the load is equal to the desired velocity of the load, means responsive to said constant reference frequency for establishing a velocity signal which is indicative of the desired velocity of the load, means responsive to said position error signal and said velocity signal for deriving an analog output signal, velocity control means responsive to said analog output signal for controlling the velocity of the load so that a zero average error in velocity results between the actual velocity and the desired velocity of the load as is indicated by the frequency of said reference pulse train, said generating means further including a digital phase comparator responsive to said scaled constant frequency pulse train, a voltage controlled oscillator for generating said reference pulse train, and a feedback loop from the output of said voltage controlled oscillator to said digital phase comparator, said feedback loop including a programmable divider therein for scaling the feedback signal to said digital phase comparator, said digital phase comparator operating to compare the phase of said scaled constant frequency pulse train and the phase of said feedback signal from said voltage controlled oscillator as scaled by said programmable divider and generating a phase error signal indicative of phase error between the phase of said scaled constant frequency pulse train and said feedback signal, said phase error signal driving said voltage controlled oscillator to generate said reference pulse train at the output thereof.

31. A control for a controlled velocity drive as defined in claim 30 wherein said generating means further including a further programmable divider connected to the output of said voltage controlled oscillator for scaling said reference pulse train.

32. A control for a controlled velocity drive as defined in claim 28 wherein said digital summing means comprises an up-down counter having an up count input terminal and a down count input terminal, one of said input terminals having pulses indicative of the frequency of said reference pulse train applied thereto and the other of said terminals having pulses indicative of the frequency of said second pulse train applied thereto, said up-down counter having a count established therein which is indicative of positional error between the actual position of the load and the desired position of the load and operating to generate said position error signal.

33. A control for a controlled velocity drive as defined in claim 32 further including anti-coincidence logic means associated with said up-down counter for preventing coincident up and down pulses from being simultaneously applied to said up and down count input terminals of said up-down counter.

34. A control for a controlled velocity drive as defined in claim 33 wherein said anti-coincidence logic includes a first pulse processor having its input connected to said reference pulse train, first gate means associated with said first pulse processor and having its output connected to one of said input terminals of said up-down counter, a second pulse processor having its input associated with said second pulse train, second gate means associated with said second pulse processor and having its output connected to the other of said input terminals of said up-down counter and clock means for sequentially activating said first and second pulse processors and said first and second gate means for effecting the sequential application of said up and down counts to said up-down counter and preventing the simultaneous application of coincident pulses to said up and down count input terminals of said up-down counter.

35. A control for a controlled velocity drive as defined in claim 34 further including overflow bit decode logic means associated with said up-down counter and including an inhibit down count output terminal connected to one of said gate means and an inhibit up count output terminal connected to the other of said gate means, said overflow bit decode logic means inhibiting the application of pulses to said input terminals of said up-down counter when said counter reaches a predetermined maximum or minimum count to prevent said counter from overflowing and returning to its zero count condition upon the application of a pulse to one of said input terminals, said overflow bit decode logic means inhibiting the application of pulses to said up-down counter by inhibiting the gate means associated with said input terminal of said up-down counter upon which the application of a pulse thereto would effect overflow of said up-down counter.

36. A control for a controlled velocity drive as defined in claim 28 wherein said control further includes second sensing means for sensing the actual velocity of the load, said compensation circuit means including means for comparing the desired velocity of the load as indicated by said reference pulse train and the actual velocity of the load as sensed by said second sensing means and generating a velocity error signal indicative of the difference between said actual velocity and said desired velocity of the load.

37. A control for a controlled velocity drive as defined in claim 36 wherein said compensation circuit further includes means for differentiating said velocity error signal and generating an acceleration compensation signal which is directed to said velocity control means to effect stabilization of said system.

38. A control for a controlled velocity drive as defined in claim 28 wherein said sensing means includes encoder means associated with the load, said encoder means operating to generate said second pulse train wherein each pulse is indicative of a predetermined amount of movement of the load and is thereby indicative of a predetermined incremental position of the load and the frequency of pulses is indicative of the velocity of the load.

39. A control for a controlled velocity drive as defined in claim 38 wherein said second sensing means comprise a tachometer generator associated with the load.

40. A control for a controlled velocity drive having a driven load comprising generating means for generating a constant reference pulse train wherein each pulse is indicative of a desired incremental position of the load and the frequency of the pulses is indicative of the desired velocity of the load, means for modifying the frequency of said reference pulse train to vary the desired velocity of the load, sensing means for sensing the position and velocity of the load and establishing a second pulse train wherein each pulse is indicative of an actual incremental position of the load and the frequency of the pulses is indicative of the actual velocity of the load, digital summing means for comparing the correspondence of the pulses of the reference pulse train and the second pulse train and generating an analog position error signal indicative of the error between the desired position of the load and the actual position of the load, means responsive to the reference pulse train for developing a first analog velocity signal which is indicative of the desired velocity of the load, second sensing means for sensing the actual velocity of the load and generating a second analog velocity signal indicative thereof, compensation means responsive to said first analog velocity signal and to said second analog velocity signal for generating an analog compensation signal, means for combining said analog position error signal, said first analog velocity signal and said analog compensation signal for generating an analog control signal and means responsive to said analog control signal for controlling the velocity of the load so that the velocity of the load follows the desired velocity and a zero average error in velocity results between the actual velocity of the load and the desired velocity of the load as is indicated by the reference pulse train.

41. A control for a controlled velocity drive as defined in claim 40 wherein said generating means includes a crystal oscillator for generating a constant frequency pulse train and means for scaling said constant frequency pulse train.

42. A control for a controlled velocity drive as defined in claim 41 wherein said generating means further includes a digital phase comparator responsive to said scaled constant frequency pulse train, a voltage controlled oscillator for generating said reference pulse train, and a feedback loop from the output of said voltage controlled oscillator to said digital phase comparator, said feedback loop including a programmable divider therein for scaling the feedback signal to said digital phase comparator, said digital phase comparator operating to compare the phase of said scaled constant frequency pulse train and the phase of said feedback signal from said voltage controlled oscillator as scaled by said programmable divider and generating a phase error signal indicative of phase error between the phase of said scaled constant frequency pulse train and said feedback signal, said phase error signal driving said voltage controlled oscillator to generate said reference pulse train at the output thereof.

43. A control for a controlled velocity drive as defined in claim 42 wherein said generating means further including a further programmable divider connected to the output of said voltage controlled oscillator for scaling said reference pulse train.

44. A control for a controlled velocity drive as defined in claim 40 wherein said digital summing means comprises an up-down counter having an up count input terminal and a down count input terminal, one of said input terminals having pulses indicative of the frequency of said reference pulse train applied thereto and the other of said terminals having pulses indicative of the frequency of said second pulse train applied thereto, said up-down counter having a count established therein which is indicative of positional error between the actual position of the load and the desired position of the load and operating to generate said position error signal.

45. A control for a controlled velocity drive as defined in claim 44 further including anti-coincidence logic means associated with said up-down counter for preventing coincident up and down pulses from being simultaneously applied to said up and down count input terminals of said up-down counter.

46. A control for a controlled velocity drive as defined in claim 45 wherein said anti-coincidence logic includes a first pulse processor having its input connected to said reference pulse train, first gate means associated with said first pulse processor and having its output connected to one of said input terminals of said up-down counter, a second pulse processor having its input associated with said second pulse train, second gate means associated with said second pulse processor and having its output connected to the other of said input terminals of said up-down counter and clock means for sequentially activating said first and second pulse processors and said first and second gate means for effecting the sequential application of said up and down counts to said up-down counter and preventing the simultaneous application of coincident pulses to said up and down count input terminals of said up-down counter.

47. A control for a control velocity drive as defined in claim 44 further including overflow bit decode logic means for inhibiting pulses applied to said input terminals of said up-down counter when said counter reaches a predetermined maximum or minimum count to prevent said counter from overflowing and returning to its zero count condition upon the application of a pulse to one of said input terminals.

48. A control for a controlled velocity drive as defined in claim 46 further including overflow bit decode logic means associated with said up-down counter and including an inhibit down count output terminal connected to one of said gate means and an inhibit up count output terminal connected to the other of said gate means, said overflow bit decode logic means inhibiting the application of pulses to said input terminals of said up-down counter when said counter reaches a predetermined maximum or minimum count to prevent said counter from overflowing and returning to its zero count condition upon the application of a pulse to one of said input terminals, said overflow bit decode logic means inhibiting the application of pulses to said up-down counter by inhibiting the gate means associated with said input terminal of said up-down counter upon which the application of a pulse thereto would effect overflow of said up-down counter.

49. A control for a controlled velocity drive as defined in claim 40 wherein said compensation means includes means for comparing the desired velocity of the load as indicated by said first analog velocity signal and the actual velocity of the load as indicated by said second analog velocity signal and generating a velocity error signal indicative of the difference between said actual velocity and said desired velocity of the load.

50. A control for a controlled velocity drive as defined in claim 49 wherein said compensation means further includes means for differentiating said velocity error signal and generating said analog compensation signal which is directed to said velocity control to effect stabilization of said system.

51. A control for a controlled velocity drive as defined in claim 50 wherein said sensing means includes encoder means associated with the load, said encoder means operating to generate said second pulse train wherein each pulse is indicative of a predetermined amount of movement of the load and is thereby indicative of a predetermined incremental position of the load and the frequency of the pulses is indicative of the velocity of the load.

52. A control for a controlled velocity drive as defined in claim 51 wherein said second sensing means comprises a tachometer generator associated with the load.

53. A control for a controlled velocity drive as defined in claim 28 wherein said generating means for generating a reference pulse train includes a phase frequency lock loop.

54. A control for a controlled velocity drive as defined in claim 40 wherein said generating means for generating a reference pulse train includes a phase frequency lock loop.

55. A control for a controlled velocity drive having a driven load comprising generating means for generating a reference pulse train having a frequency which is indicative of the desired velocity of the load, sensing means for sensing the actual velocity of the load and generating an analog velocity signal indicative thereof, means for converting said reference pulse train into an analog velocity voltage signal which is indicative of the desired velocity of the load, comparator means for comparing said analog velocity signal which is indicative of the desired velocity of the load with said analog signal indicative of the actual velocity of the load and generating an analog velocity error signal, means for differentiating said analog velocity error signal to generate an analog acceleration compensation signal, means for combining said analog acceleration compensation signal and said analog velocity signal indicative of the desired velocity of the load to produce an analog control signal and velocity control means responsive to said analog control signal for bringing about and maintain correspondence between the desired velocity of the load and the actual velocity of the load so that a zero average error in velocity results over a predetermined period of time, said generating means for generating a reference pulse train including a phase frequency lock loop.

56. A control for a controlled velocity drive having a driven load, said control comprising generator means for generating a reference pulse train of a constant reference frequency which frequency is indicative of the desired velocity of the load and wherein each pulse is indicative of a desired incremental position of the load, means for modifying the frequency of said reference pulse train to vary the desired velocity of the load, sensing means for sensing the actual position and velocity of the load and establishing a second pulse train wherein each pulse is indicative of an actual incremental position of the load and the frequency of the pulses is indicative of the actual velocity of the load, digital summing means for summing the pulses of said reference pulse train and the pulses of said second pulse train for generating a position error signal indicative of a difference between the desired incremental position of the load as indicated by the reference pulse train and the actual incremental position of the load as indicated by the second pulse train, said pulses of said first and second pulse trains having a predetermined correspondence when the actual velocity of the load is equal to the desired velocity of the load, means responsive to said constant reference frequency for establishing a velocity signal which is indicative of the desired velocity of the load, means responsive to said position error signal and said velocity signal for deriving an analog output signal, velocity control means responsive to said analog output signal for controlling the velocity of the load so that a zero average error in velocity results between the actual velocity and the desired velocity of the load as is indicated by the reference of said reference pulse train, and an overflow bit decode logic means for inhibiting pulses applied to said input terminals of said up-down counter when said counter reaches a predetermined maximum or minimum count to prevent said counter from overflowing and returning to its zero count condition upon the application of a pulse to one of said input terminals.

* * * * *

UNITED STATES PATENT OFFICE
CERTIFICATE OF CORRECTION

Patent No. 3,828,168      Dated August 6, 1974

Inventor(s) Gerald F. O'Callaghan et al.

It is certified that error appears in the above-identified patent and that said Letters Patent are hereby corrected as shown below:

Column 24, claim 56, line 50, "reference", first occurrence, should read -- frequency --.

Signed and sealed this 5th day of November 1974.

(SEAL)
Attest:

McCOY M. GIBSON JR.       C. MARSHALL DANN
Attesting Officer      Commissioner of Patents